R. S. HEEBNER, J. B. FELVER & R. DRESHER.
TRANSMISSION MECHANISM FOR AUTOMOBILES.
APPLICATION FILED JUNE 29, 1915.

1,171,846.

Patented Feb. 15, 1916.
2 SHEETS—SHEET 1.

Inventors:
Robert S. Heebner,
John B. Felver,
Raymond Dresher.

Attorneys

R. S. HEEBNER, J. B. FELVER & R. DRESHER.
TRANSMISSION MECHANISM FOR AUTOMOBILES.
APPLICATION FILED JUNE 29, 1915.

1,171,846.

Patented Feb. 15, 1916.
2 SHEETS—SHEET 2.

Inventors:
Robert S. Heebner,
John B. Felver,
Raymond Dresher,

Attorneys.

UNITED STATES PATENT OFFICE.

ROBERT S. HEEBNER, JOHN B. FELVER, AND RAYMOND DRESHER, OF LANSDALE, PENNSYLVANIA, ASSIGNORS TO THE HEEBNER-FELVER MOTOR CO., OF LANSDALE, PENNSYLVANIA, A COPARTNERSHIP COMPOSED OF ROBERT S. HEEBNER AND JOHN B. FELVER.

TRANSMISSION MECHANISM FOR AUTOMOBILES.

1,171,846.     Specification of Letters Patent.     Patented Feb. 15, 1916.

Application filed June 29, 1915. Serial No. 36,940.

*To all whom it may concern:*

Be it known that we, ROBERT S. HEEBNER, JOHN B. FELVER, and RAYMOND DRESHER, all citizens of the United States, and residents of Lansdale, county of Montgomery, State of Pennsylvania, have invented certain new and useful Improvements in Transmission Mechanisms for Automobiles, of which the following is a specification, reference being had to the accompanying drawing.

Our invention relates to improvements in change speed power transmitting mechanisms of the slidable gear selective type for automobiles.

The object of our invention is to provide a mechanism of the class to which our invention relates, of novel, simple and efficient construction having provision, firstly, whereby it may be readily substituted for a power transmitting mechanism of the planetary type such as is employed on automobiles of the well known Ford type; secondly, whereby the counter shaft carrying gear wheels may be located above the main driving shaft having the slidable gear wheels thereon, and the slidable gear wheels operated by a lever fulcrumed above the counter shaft; and, thirdly, whereby various advantages are attained.

With this object in view, our invented mechanism consists of the elements and the combinations of them hereinafter fully described and claimed.

Figure 1:
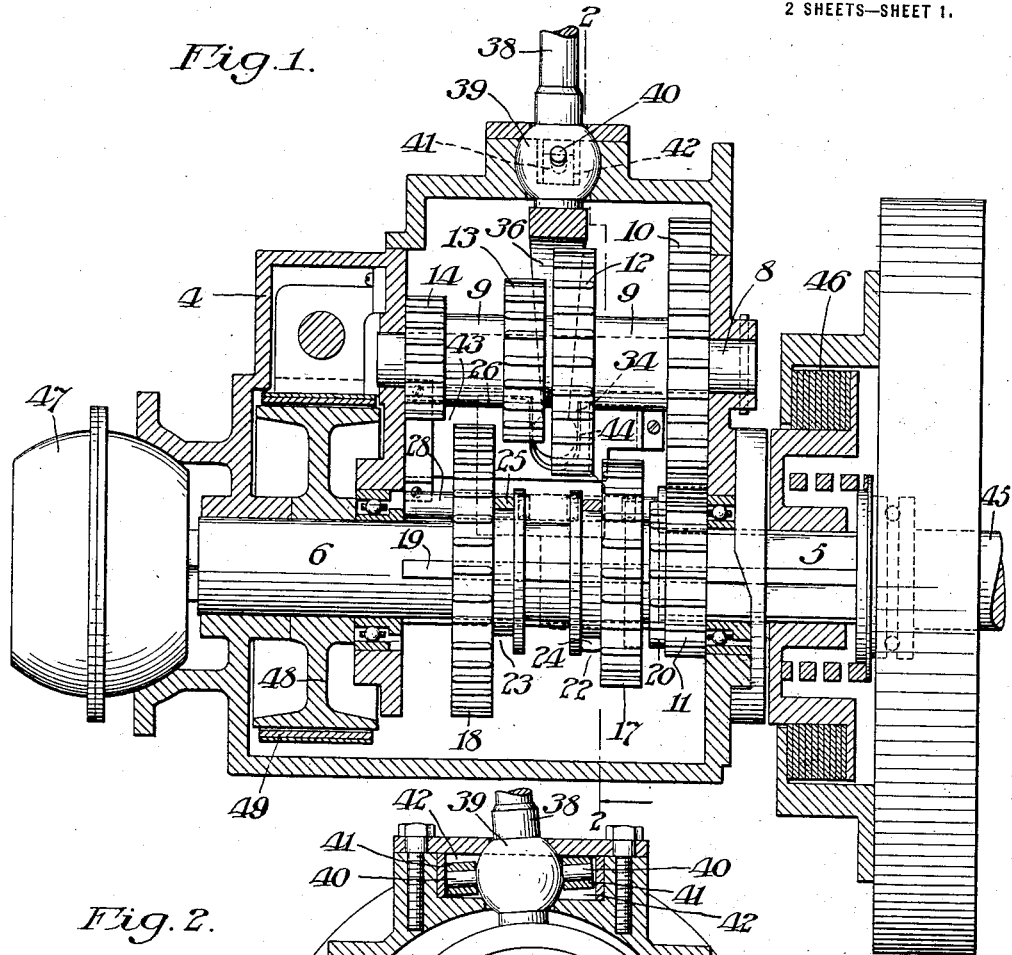
Figure 2:
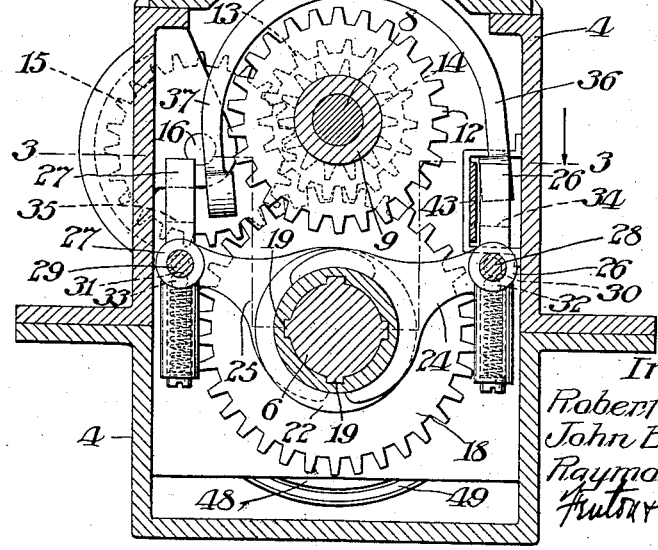
Figure 3:
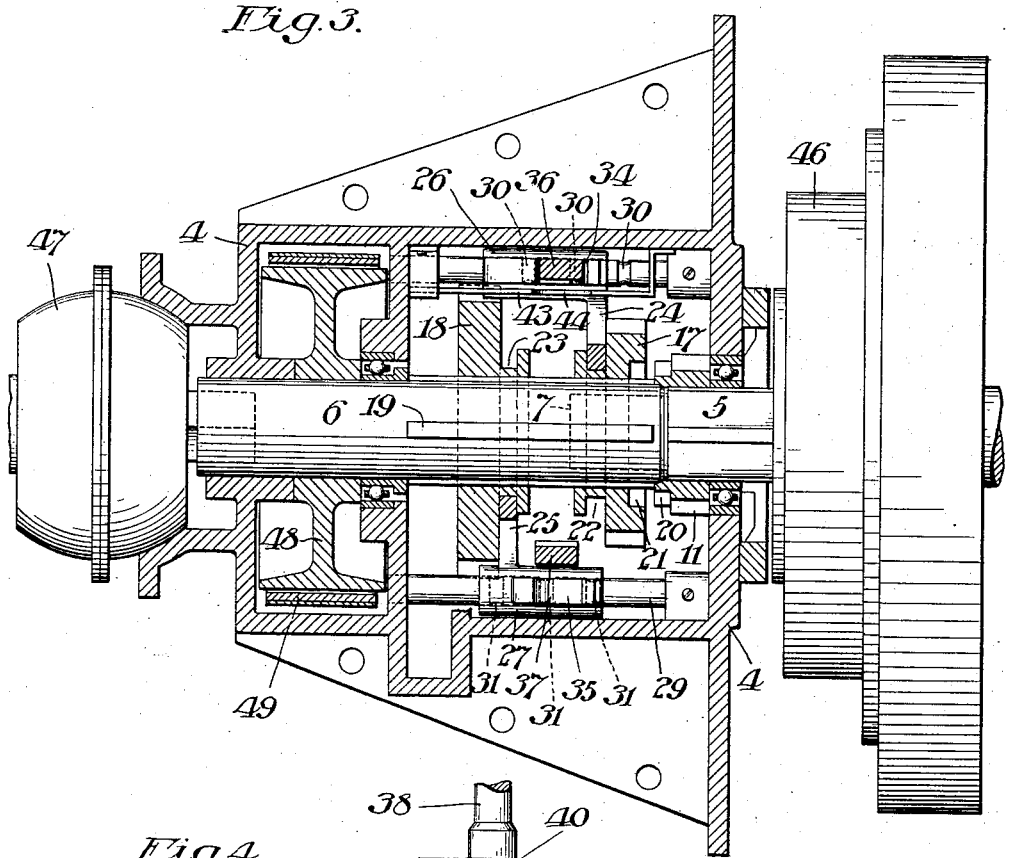
Figure 4:
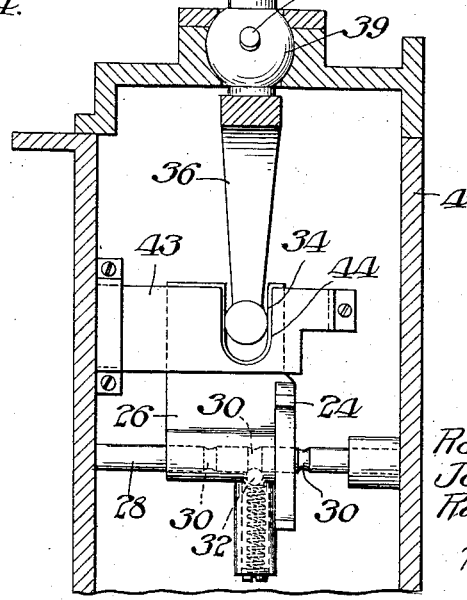

In the accompanying drawings illustrating our invention: Figure 1 is a longitudinal vertical section of a mechanism embodying our invention, the upper end of the operating lever being broken away. Fig. 2 is a transverse section thereof, on line 2—2 of Fig. 1. Fig. 3 is a sectional plan, on line 3—3 of Fig. 2. Fig. 4 is a detail showing the shifting device for one of the slidable gear wheels and adjuncts.

Referring to the drawings, 4 designates a frame or casing provided with suitable bearings in which a driving shaft 5 and a driven shaft 6 are journaled. The shafts 5 and 6 are in alinement with each other and are rotatable independently of each other, the shaft 5 having a projecting end portion 7 which is fitted to and is rotatable in an opening in the adjacent end of the shaft 6 and serves to assist in maintaining the shafts 5 and 6 in alinement with each other.

Secured in suitable bearings in the casing 4 is the counter shaft 8 which is located above the shafts 5 and 6 and has a sleeve 9 rotatably mounted thereon. The sleeve 9 is provided with a gear wheel 10 in mesh with a gear wheel 11 which is secured on the driving shaft 5 and by means of which the sleeve 9 is constantly rotated when the driving shaft 5 is rotated.

The sleeve 9 carries a gear wheel 12 for the intermediate forward speed, a gear wheel 13 for the slow forward speed, and a gear wheel 14 for the reverse drive; the gear wheel 14 being constantly in mesh with the reverse gear wheel 15 which is mounted to turn on a shaft 16 fixed in suitable bearings in the casing 4. The driven shaft 6 carries two gear wheels 17 and 18 which are slidable thereon independently of each other and which are engaged with longitudinal ribs or keys 19 on the shaft 6 to cause the shaft to turn with the wheels 17 and 18. The projecting ends 20 of the teeth of the gear wheel 11 are adapted to enter a hollow adjacent side of the gear wheel 17 and engage internal teeth 21 therein of the gear wheel 17 for the high forward speed of the driven shaft 6 or the direct drive. The gear wheel 17 is adapted to be moved longitudinally of the shaft 6 either into engagement with the gear wheel 11 for the high forward speed of the driven shaft 6, as just mentioned, or into mesh with the gear wheel 12 for the intermediate forward speed of the driven shaft 6, or into the neutral position shown in the drawings between the gear wheels 11 and 12. The gear wheel 18 is adapted to be moved longitudinally of the shaft 6 either into mesh with the gear wheel 13 for the low forward speed of the driven shaft 6, or into mesh with the gear wheel 15 for the reverse drive of the driven shaft 6, or into the neutral position shown in the drawings between the gear wheels 13 and 15.

The hubs of the slidable gear wheels 17 and 18 are provided with circumferential grooves 22 and 23 into which are fitted arms 24 and 25 projecting from two shifting devices 26 and 27 which are mounted to slide on shafts 28 and 29, respectively, and which are adapted to be operated to shift the gear wheels 17 and 18 longitudinally on the shaft 6, independently of each other. The shafts 28 and 29 are fixed within the casing 4 on the respective sides of the gearing therein, and the shafts 28 and 29 are provided with grooves 30 and 31 adapted to receive spring pressed balls 32 and 33 carried within openings in the shifting devices 26 and 27, respectively. The grooves 30 and 31 are spaced on the shafts 28 and 29 to receive the balls 32 and 33 and maintain the devices 26 and 27 and therewith the gear wheels 17 and 18 respectively, in the neutral and gear wheel engaging positions previously described, the balls 32 and 33 being forced out of their grooves 30 and 31, respectively, against their springs when the shifting devices 26 and 27 are moved to shift the gear wheels 17 and 18.

The shifting devices 26 and 27 have openings 34 and 35 therein adapted to receive the free ends of the arms 36 and 37, respectively, of the lower bifurcated end of a lever 38 which extends up through and beyond the top of the casing 4, and the upper end of which is adapted to be operated by hand. The lever 38 has a ball 39 formed thereon or secured thereto which is fitted to a bearing in the top wall of the casing 4 in a manner to provide a fulcrum for the lever 38 and permit it to be rocked forwardly or backwardly in the direction of the shaft 8 or rocked laterally from side to side in a direction transversely of the shaft 8. The lever 38 is prevented from turning about its longitudinal axis by two oppositely disposed pins 40 which project outwardly from the ball 39 and into blocks 41 which are fitted to slide vertically in suitable guideways 42 in the casing 4. The pins 40 are in alinement with each other on a common axis which extends through the center of the ball 39 and at right angles to the plane of the forward and back rocking movement of the lever 38; and, therefore, when the lever 38 is rocked laterally, the blocks 41 will slide up and down in the guideways 42, and, when the lever 38 is rocked forwardly and backwardly, the lever 38 will fulcrum on the axis of the pins 40.

The lower bifurcated end of the lever 38 embraces the counter shaft 8 and the gearing thereon, and when the lever 38 is rocked laterally the free ends of the arms 36 and 37 of its bifurcated end are adapted to be moved into and from the openings 34 and 35 of the shifting devices 26 and 27, respectively, the arm 36 moving into the opening 34 and the arm 37 moving out of the opening 35 when the lever 38 is rocked to one side, and the arm 37 moving into the opening 35 and the arm 36 moving out of the opening 34 when the lever 38 is rocked to the other side. When the arm 36 is within the opening 34 the lever 38 may be rocked forwardly and backwardly and thereby cause the arm 36 to operate the shifting device 26 to move the gear wheel 17 into and from engagement with the gear wheels 11 and 12 and into and from its neutral position between them without affecting the shifting device 27; and when the arm 37 is within the opening 35 the lever 38 may be rocked forwardly and backwardly and thereby cause the arm 37 to operate the shifting device 27 to move the gear wheel 18 into and from engagement with the gear wheels 13 and 15 and into and from its neutral position between them without affecting the shifting device 26.

To prevent the lateral rocking of the lever 38 excepting when it and the two shifting devices 26 and 27 and gear wheels 17 and 18 are in the neutral position shown in the drawings, we provide a guard plate 43 which extends adjacent and parallel to the guiding shaft 28 for the shifting device 26, and has its respective ends suitably secured to the casing 4. The guard plate 43 is provided with an opening 44 therein which is in registry with the arm 36 and openings 34 and 35 when the lever 38 and shifting devices 26 and 27 are in the neutral position and through which the arm 36 may move from side to side of the plate 43 only when the parts are in the neutral position, the arm 36 being engaged with the shifting device 26 when the arm 36 is on one side of the guard plate 43, and the arm 37 being engaged with the shifting device 27 when the arm 36 is on the other side of the guard plate 43.

The driving shaft 5 is adapted to be connected to a motor shaft 45 by a suitable clutch device 46; and the driven shaft 6 is adapted to be connected with the driving mechanism of the rear axle of an automobile by a suitable universal joint 47; and the shaft 6 is provided with a brake wheel 48 surrounded by a suitably operated band 49.

We claim:

1. The combination of a casing, a change speed mechanism including two gear wheels slidable into and out of operative positions, a lever mounted on said casing and having a bifurcated end, means operated by one arm of said bifurcated end for moving one of said gear wheels, and means operated by the other arm of said bifurcated end for moving the other of said gear wheels.

2. The combination of a casing, a change speed mechanism having a lower shaft and an upper shaft and coöperating gearing between said shafts including two gear wheels slidable on said lower shaft into and out of operative positions, a lever mounted on said casing above said upper shaft and having a bifurcated lower end embracing said upper shaft, means operated by one arm of said bifurcated end for moving one of said gear wheels, and means operated by the other arm of said bifurcated end for moving the other of said gear wheels.

3. The combination of a casing, a change speed mechanism including a shaft and two gear wheels thereon and two shifting devices operatively connected to said gear wheels and movable independently of each other from a neutral position into operative positions, a lever mounted on said casing to move forwardly and backwardly from a neutral position and adapted to move said devices, said lever being movable laterally into and from operative relation to the respective shifting devices of said gear wheels and being moved out of operative relation to one device while being moved into operative relation to the other device, and a guard fixed to the casing and preventing lateral movement of said lever when out of its said neutral position.

4. The combination of a casing, a change speed mechanism having a lower shaft and an upper shaft and coöperating gearing between said shafts including two gear wheels slidable on said lower shaft and two shifting devices operatively connected to said gear wheels and movable independently of each other from a neutral position into operative positions, a lever mounted on said casing above said upper shaft to move laterally and forwardly and backwardly from a neutral position and having a bifurcated lower end embracing said upper shaft and adapted to move said devices, the two arms of said bifurcated end being movable into and from operative relation to the respective shifting devices of said gear wheels when said lever is moved laterally, one arm being moved into operative relation to one shifting device while the other arm is being moved out of operative relation to the other shifting device, and means preventing lateral movement of said lever when out of its said neutral position.

5. The combination of a casing, a change speed mechanism having a lower shaft and an upper shaft and coöperating gearing between said shafts including two gear wheels slidable on said lower shaft and two shifting devices operatively connected to said gear wheels and movable independently of each other from a neutral position into operative positions, a lever mounted on said casing above said upper shaft to move laterally and forwardly and backwardly from a neutral position and having a bifurcated lower end embracing said upper shaft and adapted to move said devices, the two arms of said bifurcated end being movable into and from operative relation to the respective shifting devices of said gear wheels when said lever is moved laterally, one arm being moved into operative relation to one shifting device while the other arm is being moved out of operative relation to the other shifting device, and a guard fixed to the casing and preventing lateral movement of said lever when out of its said neutral position.

6. The combination of a casing, a change speed mechanism having a lower shaft and an upper shaft and coöperating gearing between said shafts including two gear wheels slidable on said lower shaft and two shifting devices operatively connected to said gear wheels and movable independently of each other from a neutral position into operative positions, a lever mounted on said casing above said upper shaft to move laterally and forwardly and backwardly from a neutral position and having a bifurcated lower end embracing said upper shaft and adapted to move said devices, the two arms of said bifurcated end being movable into and from operative relation to the respective shifting devices of said gear wheels when said lever is moved laterally, one arm being moved into operative relation to one shifting device while the other arm is being moved out of operative relation to the other shifting device, and a guard plate having an opening therein and fixed to said casing and extending adjacent to and adapted to be engaged by one of said arms to prevent lateral movement of said lever when it is out of its said neutral position, said opening permitting the said adjacent arm to move therethrough from side to side of said plate when said lever is moved laterally in its said neutral position.

In witness whereof, we have hereunto set our hands this 26th day of June, 1915.

ROBERT S. HEEBNER.
JOHN B. FELVER.
RAYMOND DRESHER.